Jan. 4, 1966    G. W. LUEBERING ET AL    3,227,176
WINDMILL CONTROL SYSTEM FOR MULTI-ENGINED AIRCRAFT
Filed Dec. 31, 1962    2 Sheets-Sheet 1
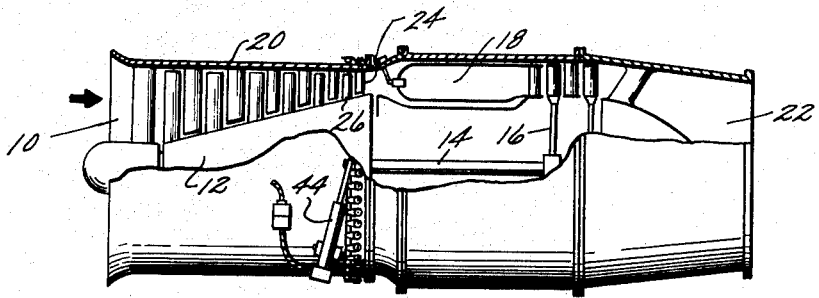
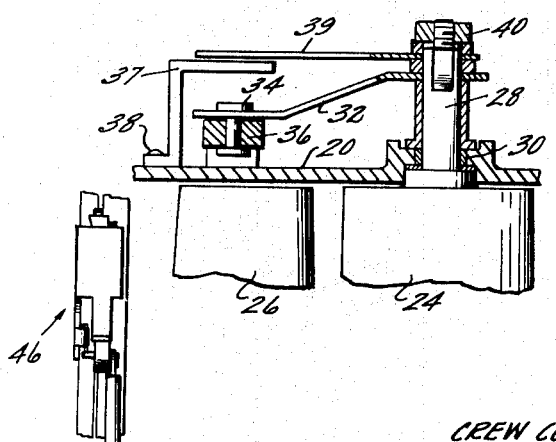
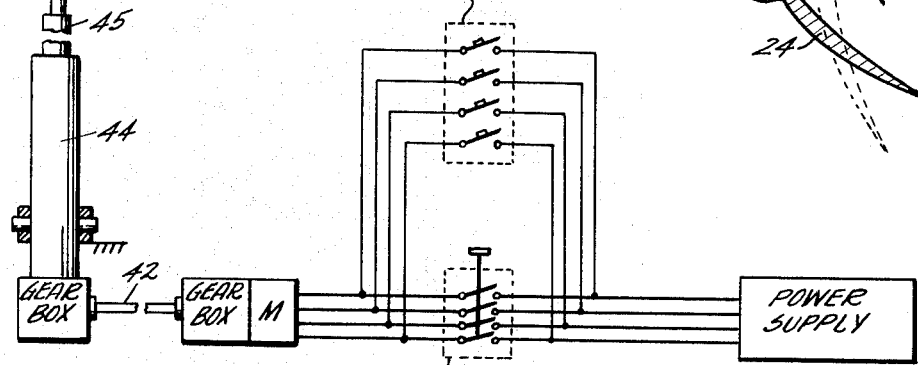
INVENTORS.
NORBERT J. MEYER
BY GEORGE W. LUEBERING
Harry C. Burgess
ATTORNEY—

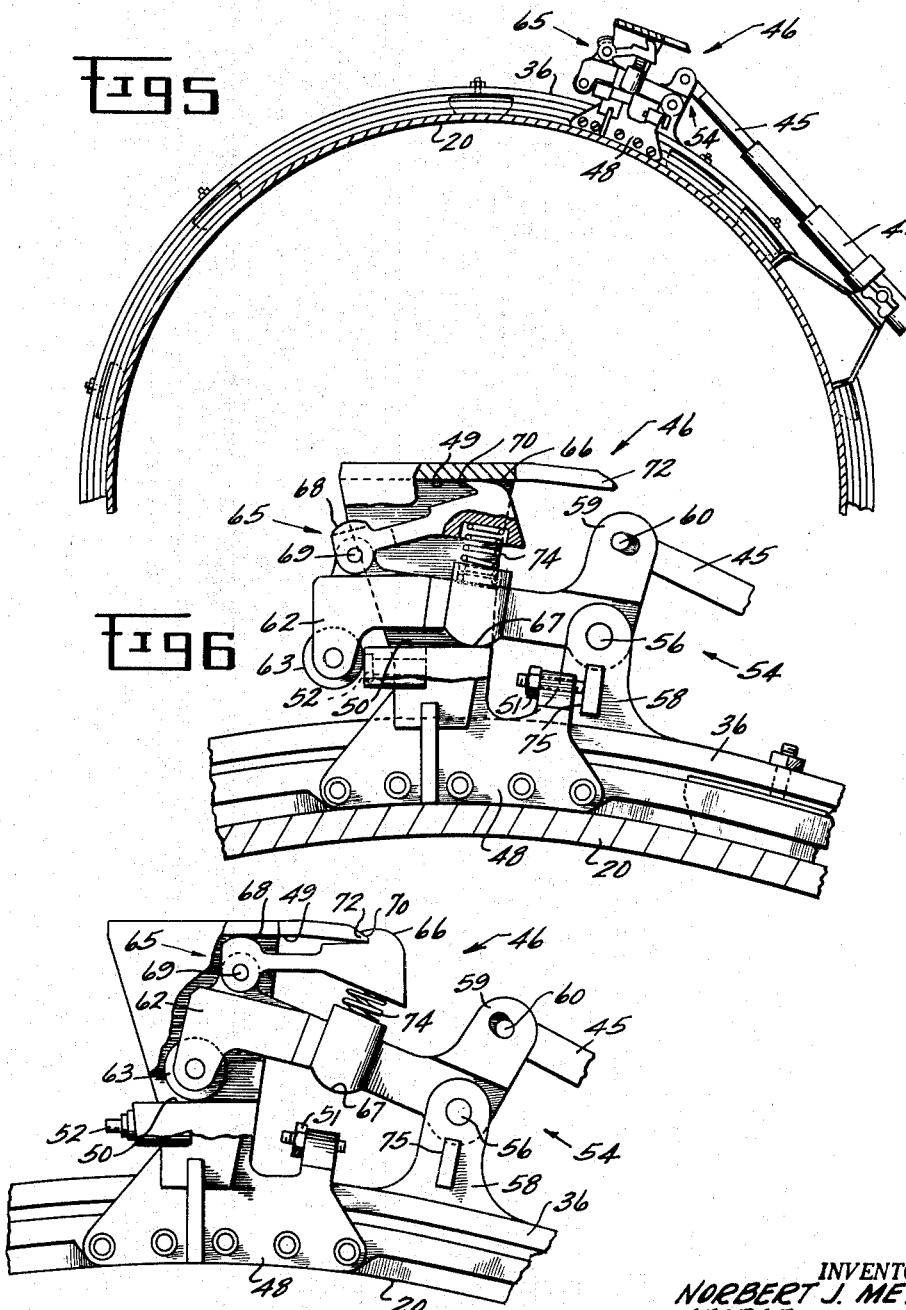

United States Patent Office 3,227,176
Patented Jan. 4, 1966

3,227,176
WINDMILL CONTROL SYSTEM FOR MULTI-ENGINED AIRCRAFT
George W. Luebering and Norbert J. Meyer, Cincinnati, Ohio, assignors to General Electric Company, a corporation of New York
Filed Dec. 31, 1962, Ser. No. 248,535
6 Claims. (Cl. 137—601)

This invention relates to a windmill control system for multi-engine aircraft and, more specifically, to a positive latching mechanism in a control system adapted to prevent one (or more) of a plurality of turbojet type engines which has become non-operative at high rotative speeds, i.e., at high supersonic flight velocities, from windmilling to such an extent as to create an undesirable or possibly dangerous flight situation. A portion of the disclosure herein is common to the application of Kast entitled "Control Mechanism," Serial No. 248,534, filed December 31, 1962 and assigned to the assignee of this invention.

Until very recently operation of single and multi-engine jet aircraft, with the possible exception of a few experimental military vehicles, has largely been confined to flight speeds of Mach 2.0 (about 1200 m.p.h.) and under. More advanced high-Mach military aircraft and supersonic commercial jet transports scheduled for use in the near future will, however, operate at considerably higher speeds. It has therefore become necessary to place added stress on reliability of the aircraft, engines, and related systems. The related problems of reliability and safety will perhaps be more acute in the case of future high-Mach aircraft utilizing advanced high performance turbojet type engines. For reasons of passenger and crew member safety and mission accomplishment, it will therefore be essential that such an aircraft be able to continue to perform its flight mission with one—or perhaps more—of its engines non-operative.

Obviously, a certain point can be reached in any multi-engine installation when enough of the powerplants would become non-operative to prevent the continuation of flight. Assuming, however, that flight is still possible, one of the primary problems in these multi-engine high speed aircraft utilizing turbojet or turbofan engines, i.e., any engine which has rotating components such as compressor and power turbine bladed rotors mounted on a shaft, concerns the high rotative speed of the shaft caused by the force of the air entering the engine inlet. To explain, if a gas turbine engine becomes non-operative at a high Mach number because of failure of one of the many accessory, fuel system, or lubrication system components, for example, the supersonic velocity of the air produces an extremely high total pressure at the inlet of the engine which will be combined with a low total pressure at the exit. When the high rotative speed of the non-operating engine, involving extremely large moments of rotating inertia, is coupled with a dearth of engine lubrication system heat sink (since there would no longer be fuel flowing to the non-operating engine and the heat sink or cooling medium for the lubrication fluid normally furnished by the fuel would not be available), inevitably the result is seizure of the rotor shaft bearings. An abrupt seizure could produce an undesirable and even dangerous condition in the aircraft or vehicle by reason of the engine mounting structure or engine nacelle suffering severe structural damage during the sudden and violent deceleration of the rotating components. In the case of a supersonic commercial transport, or even a military bomber, it will be vital that the aircraft continue to maintain altitude and speed using the remaining operating engines. That the problem is particularly acute in aircraft designed to fly at Mach 2.5 and above will be realized when it is understood that if the fuel is cut off a non-operative turbojet engine can windmill at up to 93% of full speed. The solution to the problem of windmilling is further complicated by the fact that in the design of aircraft capable of these high speeds, the problem of weight is critical. Thus, it has been found that proposals for use of inlet duct closure means, such as flaps, or compressor variable inlet guide vanes have had to be abandoned as impractical since these structures, of necessity, must be relatively massive and heavy to withstand the air blast. Another suggested solution involving reverse turbine rotor blade air impingement during windmilling to brake the rotor has also proved to be less than desirable due to the inefficiency occasioned by the unfavorable curvature of the typical turbine blade airfoil.

It is therefore highly desirable that whatever means or system is chosen to control windmilling that reliability and safety of operation be prime design criteria. In addition, any proposed windmill control system should include some means for ensuring positive control of the rotor braking action. In other words, immediate initiation of the braking action should be possible and once rotation of the turbojet engine shaft has been halted, or sufficiently slowed, means preferably are provided to avoid accidental release of the braking mechanism. In addition, it may be necessary to ensure against undesired actuation of the control system, i.e., movement of the system components towards the braking position.

Accordingly, a general object of the present invention is to provide a safe, reliable windmill brake control system to avoid the undesirable effects of windmilling in a non-operative turbojet type engine (or engines) in a multi-engine aircraft to enable the aircraft to continue its normal flight mission.

A more specific object of the present invention is to provide a safe, reliable windmill brake control system for a non-operative turbojet type engine (or engines) in a multi-engine, high-Mach aircraft, which system can be energized independently of the operation of any single given engine on a signal from the aircraft operator, including positive means for maintaining the system in the desired attitude, i.e., non-functioning while the engine operates, and non-reversible after energization to prevent windmilling.

Briefly stated, one embodiment of our invention comprises a windmill brake control system for use in a high-speed aircraft having a multiplicity of turbojet type engines each including a compressor having a row of adjustable stator vanes adjacent the compressor outlet, the system including a power source, motor means energized by the power source, force transmission means operably connected to the motor means, linkage means operably connecting the force transmission means to the row of adjustable compressor stator vanes, and a positive latching mechanism comprising a bellcrank having first and second arms extending at right angles to each other, the bellcrank being pivotally mounted on the linkage at the juncture of the arms, a support bracket fixed with respect to the linkage and having motion stops and cam surfaces limiting and guiding travel, respectively, of the linkage means between two extreme positions, and a spring loaded locking member, the member being mounted at the free end of one of the arms, the other bellcrank arm being connected to the force transmission means, and wherein the bellcrank pivot point, the arm-to-force transmission means connection and the stop means are so located that aerodynamic forces imposed on the linkage means through the vanes are prevented from actuating the mechanism, when in the "normal" operating position of one extremity, and the locking member prevents travel back towards the one extremity after the linkage has moved to the other extremity to prevent windmilling.

Other objects and advantages of the invention will become more apparent and the invention better understood when the following detailed description is read in conjunction with the drawings thereof wherein:

FIG. 1 is a side view, partially cut away, to illustrate the arrangement of components in a typical turbojet engine, the engine having a row of adjustable stator vanes;

FIG. 2 is an enlarged view, partially in cross-section, of a portion of the mechanism used to rotate a stator vane about its axis, including a side view of the vane position indicating means;

FIG. 3 is a plan view of the vane position indicating means of FIG. 2;

FIG. 4 is a schematic drawing of the components of the windmill control system for moving the vanes of FIGURES 2 and 3 between the "open" and "closed" positions, including means for reset and inspection by ground maintenance personnel and linkage means for locking the vanes in the desired position;

FIG. 5 is an enlarged partial view of the linkage mechanism portion of the system;

FIG. 6 illustrates in detail the latching or locking portion of the linkage mechanism in the vane "open" (normal operating) position; and FIG. 7 illustrates in detail the latch or locking portion of FIGURE 6 in the "closed" or windmill braking position.

While the subsequent detailed description of our windmill control system will utilize a conventional single shaft turbojet engine for purposes of illustration, it will be understood that any gas turbine engine having two or more compressor and turbine rotors, respectively, mounted on a main shaft may equally benefit from the teachings of the invention.

Turning now specifically to FIGURE 1, shown is a typical turbojet engine having an inlet end, indicated generally at 10. The engine includes a compressor rotor 12 mounted on a central shaft 14. The shaft 14 also supports a turbine rotor 16 furnishing the driving force for the compressor rotor. The turbine rotor may be single or double staged (dual rotors), as shown. Intermediate the compressor and turbine rotors are means for providing combustion in the engine, such as a plurality of liners or cans, one of which is indicated at 18. The engine components are surrounded in the usual manner by an outer casing 20 providing a duct through which air flows in the direction of the large arrow in FIGURE 1. After combustion takes place, the hot gas stream exits through an engine exhaust nozzle, indicated generally at 22. In the disclosed embodiment, a part of the windmill control system for the engine depicted, which will be one of a number of like engines and partial systems in a multi-engine installation, comprises a row of variable stator vanes 24 at the rear of the compressor. The stator vanes, as is normal, are located adjacent a row of compressor rotor blades, indicated at 26. As shown in the enlarged view of FIGURE 2, each variable stator vane 24 includes a trunnion 28 projecting outwardly through an opening 30 in the casing 20. Linkage means for rotating the adjustable stator vanes includes a lever arm 32 secured at one end to the trunnion, the other end of the arm being connected by suitable means, such as pin 34, to a circumferentially-extending actuator ring 36. The ring is adapted to be moved in a rotary direction with respect to the engine and preferably comprises a pair of so-called "half-rings" suitably joined.

FIGURES 2 and 3 also illustrate the vane position indicator means used during system "reset" by ground personnel, as hereinafter described. The vane position indicator comprises an L-shaped bracket 37 secured at 38 to the casing. The bracket is marked to indicate whether the vanes are in the "closed" or "open" position through use of a pointer 39, rigidly affixed by a nut 40 to one of the vanes.

The primary elements of the windmill control system of the disclosed embodiment are schematically depicted in FIGURE 4. An electrical power supply (e.g., 115 volt, 3-phase, 400 cycle A.C.) is indicated at the right hand portion of the diaphragm with conduits or connecting power lines leading therefrom through a pilot control to a motor, indicated at "M." The motor, in turn, is connected to a speed reducing device including gear boxes interconnected by a flexible shaft 42. The driven gear or gear box is rigidly fastened to, or made integral with force transmission means in the form of a mechanical actuator 44 having a rod 45 pivotally attached to the ring 36 through a linkage mechanism, indicated generally at 46.

FIGURES 5–7 illustrate in more detail the novel linkage means and latching mechanism of our invention whereby the force transmission means is able to adjust the row of stator vanes between an "open" and a "closed" position, including means for positive locking of the linkage in either position. In addition to the aforementioned ring 36 and the lever arm 32, the mechanism includes a support plate or bracket 48 rigidly affixed to the casing 20. The bracket or plate contains a pair of cam surfaces, indicated at 49 and 50, respectively and adjustable stop means 51–52. The stop means 51 is set to provide a desired limit of ring travel to the "open" position while stop 52 is preferably self-adjustable. The position of the bracket 48 may also be located to determine ultimate limits of vane travel. To enable movement of the actuator rod 45 to be transmitted to the ring 36 a bellcrank, indicated generally at 54 is provided. The bellcrank is pivotally mounted on the ring 36 at 56, by means of a clevis 58. One arm 59 of the bellcrank is pivotally attached at 60 to the rod end. The other or longer arm 62 of the bellcrank supports a bearing member 63, adapted to cooperate with the surface of the self-adjustable stop means 52, and a locking member 65 adapted to cooperate with cam surface 49. Additional stop or guide means 66, 67, and 68 cooperate with the cams 49 and 50 to guide and limit rotation and movement of the bellcrank during actuation of the system. The locking member is pivotally attached at 69 to the bellcrank to facilitate movement along the cammed surface 49 and into the locking position, as shown in FIGURE 7. When the locking member reaches a limit of travel, as shown in FIGURE 7, a lip portion 70 thereon catches a projection or extension 72 of the bracket 48 at one end of cam surface 49. In addition, resilient means in the form of spring 74 is provided to resist movement of the locking member—and the bellcrank—once the locking member has reached the desired position. Initial motion of the bellcrank off the vane "open" position of FIGURE 6 is facilitated by the bearing means 63 which, at that time, is resting against the surface of stop means 52.

In operation, during flight the windmill control system linkage mechanism of the present invention provides a positive locking action to maintain the adjustable stator vanes in their "open," or normal position. As shown in FIGURE 6, locking member 65, and bellcrank 54 to which it is attached, is held in the "open" position through coaction of the locking member bearing means 63 with stop means 52, which coaction is aided by the leverage afforded by the resilient spring means 74 forcing stop or guide means 66 and 67 against cam surfaces 49 and 50, respectively. In this position, aerodynamic forces imposed on the stator vanes and tending to move the ring and clevis 58 to the right in the drawing—or to the "closed" position—are resisted by stop means 52. On the other hand, any forces tending to move the ring to the left are resisted by projection 75 on the ring being in abutment with the adjustable stop means 51. Thus, means are provided to lock the windmill brake system in either direction against varying load forces during normal or vane "open" operation.

If it should be desired to shut down an engine because of a sudden malfunction, the aircraft operator will manually apply a signal through the pilot control to energize the motor and drive the force transmission means 44. This will cause the rod 45 to move to the right, in the drawing, causing a moment about point 56 and pivoting arm 62 of the bellcrank upwardly about the pivot point. This will depress spring 74 and cause the locking member bearing means 63 to disengage from the surface of stop means 52. The ring, and thus the bellcrank, will continue to move to the right with the locking member guide portion 66 bearing against the cammed surface 49 and bearing means 63 riding on surface 50. This coaction will aid in directional control of movement and help to resist actuation force loads tending to cause bending in the linkage since the long arm 62 of the bellcrank is closely confined between the cammed surfaces. When the locking member has moved far enough, i.e., to the right in the drawings, and the stator vanes reach the fully "closed" position—blocking flow through the non-operating engine—the locking member catch portion 70 will be urged into place against the "closed" position latching stop or lip 72, being retained thereat by a hooking action or force and the action of the spring 74. If for some reason a force tending to "unlock" the linkage, i.e., to move the vanes toward the "open" position of FIGURE 6, should be fed back through the ring member 36, the locking arrangement of the linkage mechanism will prevent such movement since the locking member 65 will not be able to disengage.

The positive locking or safety feature provided by the present invention thus ensures first, that once an engine is disabled, loads imposed on the vanes or accidental actuation of the power system will not cause the non-operating engine to become unbraked or unblocked, and thus free to windmill. In addition, self-locking is also incorporated in the linkage mechanism when in the "open" position by location of the bellcrank pivot point 56 so all forces acting through the ring member pass through the bellcrank pivot point and no moments tending to pivot the bellcrank result, and by so locating stop 67, bearing means 63, and spring 74 so that the bellcrank cannot be moved by reason of vibration or flight maneuver forces being fed through the system. Thus, any signal to move toward the "closed" position *must* come through the actuator, i.e., from the aircraft operator. The windmill brake system therefore provides uni-directional control for driving the variable stator blades 24 to the completely closed position during flight if, *and only if,* a serious malfunction or sudden complete loss of power occurs in one or more of the engines of the multi-engine installation. In such event, the affected engine(s) can be prevented from windmilling to destruction by completely blocking off the duct formed at the aft end of the compressor rotor 12. As stated above, in high-Mach jet aircraft the high speeds of the rotor shaft which would result from allowing the engine to freely turn during such supersonic velocities would inevitably result in sudden seizure of the main rotor shaft supporting the compressor and turbine rotors which could prove potentially disastrous either to the engine or the aircraft. Note that with the described system no complex heavy inlet guide vane or inlet duct flaps are employed, but rather a more compact and lighter mechanism is provided when use is made of the smaller stator vanes located at the rear of the compressor where the flow annulus is considerably smaller in cross-sectional area and, of course, easier to close down.

In addition, movement in the opposite direction to vane closure, and at a lower force level, is provided to make possible *ground* reset of the variable stators to the normally open position. The ability to reset the system is a prime requirement to permit ground safety checkout and stator vane repositioning, if necessary, to demonstrate total system operability and engine reliability periodically and prior to an actual aircraft mission. Ground check-out is provided with an access door in the aircraft nacelle (not shown) which enables a view of the engine casing corresponding geneerally to FIGURE 3. Thus, on opening an access door, maintenance personnel will see the indicator bracket 37 indicating whether the vanes are in the "closed" or "open" position by means of the pointer 39 affixed to the outer end of one of the vanes. Reset will, of course, require that the locking member catch 70 be manually disengaged from the "closed" stop or latch 72. The crew control switch, shown in FIGURE 4, for accomplishing reset is situated so that it is only accessible when the aircraft is on the ground. In addition, the polarity of the reset voltage is preferably arranged to be opposite to that of the windmilling control signal applied during flight and is also single- or two-phase, i.e., reduced voltage. In this manner, the force necessary to reset the vanes is at a lower value than the windmill brake closure force level to help protect and reduce wear on the mechanical linkage part of the system, in particular, the "open" position latching and stop means, shown in FIGURES 6 and 7.

In the disclosed windmilling control system which is designed to meet a critical high-Mach, multi-engined aircraft requirement, namely, the ability to block flow through the compressor for safe shutdown of a malfunctioning engine(s) while maintaining high supersonic flight speeds with the remaining engines, the latching and linkage means of the present invention ensures against accidental closing down of an engine until such time as the aircraft operator himself desires to energize the system and, once energized, that the stator vanes will be maintained in the "closed" position.

What we desire to claim is:

1. In a turbojet engine windmill brake control system:
    a row of variable stator vanes;
    latching means, said latching means including:
       a driven member, said driven member being operably connected to said row of vanes for adjustment thereof between two extreme positions and having a pivot point fixed thereon;
       a bellcrank having a first arm and a second arm, said arms extending at right angles to each other, said bellcrank being mounted on said pivot point at the juncture of said arms;
       a support member, said member being fixed with respect to said driven member and having a plurality of stop means thereon;
       a locking member, said locking member being mounted on the free end of said first arm;
       motor means connected to the free end of said second arm; and
       wherein said pivot point, said stop means, and said motor means connections are each so located with respect to the other that in one of said extreme positions aerodynamic load forces imposed on said driven member through said vanes are prevented from moving said driven member, and in said other extreme position said locking member prevents reverse movement of said vanes to said one of said extreme positions.

2. In a turbojet engine windmill brake control system:
    a row of variable stator vanes;
    latching means, said latching means including:
       a driven member, said driven member being operably connected to said row of vanes for adjustment thereof between two extreme positions and having a pivot point fixed thereon;
       a bellcrank having a long arm and a short arm, said arms extending at right angles to each other, said bellcrank being mounted on said driven member pivot point at the juncture of said arms;
       bearing means at the free end of said long arm;
       a support member, said member being fixed with respect to said driven member and having a plurality of stop means thereon;

a locking arm, said locking arm being pivotally mounted adjacent said bearing means;

motor means connected to the free end of said second arm;

said bearing means being adapted to releasably engage one of said stop means when said vanes are in one of said extreme positions, and wherein said pivot point, said stop means, and said motor means connection are each so located with respect to the other that in said one of said extreme positions aerodynamic load forces imposed on said driven member through said vanes are prevented from moving said driven member, and in said other extreme position said locking arm prevents reverse movement of said vanes to said one of said extreme positions.

3. In a turbojet engine windmill brake control system: a row of variable stator vanes; latching means, said latching means including:

a driven member, said driven member being operably connected to said row of vanes for adjustment thereof between two extreme positions and having a pivot point fixed thereon;

a bellcrank having a long arm and a short arm, said arms extending at right angles to each other, said bellcrank being mounted on said driven member pivot point at the juncture of said arms;

a support member fixed with respect to said driven member, said support member having a plurality of stop means and cam surfaces thereon, said stop means and cam surfaces limiting and guiding motion, respectively, of said bellcrank and driven member;

a locking member, said locking member being mounted at the free end of said long arm, said locking member having a first means thereon adapted to engage one of said cam surfaces in one of said extreme positions, in which case the free end of said long arm is in releasable engagement with one of said stop means, a second means on said locking member being adapted to permanently engage another of said stop means when said driven member has adjusted said vanes to the other of said extreme positions;

motor means connected to the free end of said second arm; and wherein said pivot point, said stop means, and said motor means connection are each so located with respect to the other that in said one of said extreme positions aerodynamic load forces imposed on said driven member through said vanes are prevented from moving said driven member, and in said other extreme position said locking member prevents reverse movement of said vanes to said one of said extreme positions.

4. In a turbojet engine windmill brake control system: a row of variable stator vanes; latching means, said latching means including:

a driven member, said driven member being operably connected to said row of vanes for adjustment thereof between two extreme positions and having a pivot point fixed thereon;

a bellcrank having a long arm and a short arm, said arms extending at right angles to each other, said bell crank being mounted on said driven member pivot point at the juncture of said arms;

bearing means at the free of said long arm;

a support member fixed with respect to said driven member, said support member having a plurality of stop means and cam surfaces thereon;

a locking member pivotally mounted adjacent said bearing means, said locking member having a first means thereon adapted to engage one of said cam surfaces for slidable motion thereon, wherein when said driven member has adjusted said vanes to one of said extreme positions, said bearing means is releasably engaged with a first of said stop means and a second of said stop means is engaged with said driven member, and a second means on said locking member adapted to permanently engage a third of said stop means when said driven member has adjusted said vanes to the other of said extreme positions;

motor means connected to the free end of said short arm and operable to rotate said bellcrank about said pivot point to disengage said bearing means, said bearing means being slidable on another of said cam surfaces; and wherein said first and second stop means limit vane adjustment in said one of said extreme positions and in said one extreme position said pivot point, said first stop means and said motor means connection are each so located with respect to the other as to ensure that aerodynamic load forces imposed on said driven member through said vanes are prevented from moving said driven member, and in said other extreme position said locking member prevents reverse movement of said vanes to said one of said extreme positions.

5. A turbojet engine windmill brake control system for use in combination with a row of variable stator vanes adjustable between two extreme positions, said system including:

a power source;

motor means energized by said power source;

force transmission means operably connected to said motor means;

linkage means operably connecting said force transmission means to said row of stator vanes for adjustment thereof; and a positive latching mechanism comprising a bellcrank having first and second arms extending at right angles to each other, said bellcrank being pivotally mounted on said linkage means at the juncture of said arms, a bracket fixed with respect to said linkage means and having a plurality of stop means adapted to engage said linkage means and the free end of said first arm to limit travel of said linkage means towards either of said two extreme positions, and a locking member pivotally mounted at said free end of said first arm, the free end of said second arm being operably connected to said force transmission means; and wherein the bellcrank pivot point, the second arm-to-force transmission means connection, and the stop means are each so located with respect to the other that aerodynamic forces imposed on said vanes during normal operation in one of said extreme positions cannot move said linkage means in the absence of a signal applied to said force transmission means, and wherein when said vanes have been adjusted for windmill braking in the other extreme position, said linkage means is prevented from moving back towards said normal position.

6. A turbojet engine windmill brake control system for use in combination with a row of variable stator vanes adjustable between two extreme positions, said system including:

a power source;

motor means energized by said power source;

force transmission means operably connected to said motor means;

linkage means operably connecting said force transmission means to said row of stator vanes for adjustment thereof; and a positive latching mechanism comprising a bellcrank having a long arm and a short arm joined thereto and extending at a right angle therefrom, said bellcrank being pivotally mounted on said linkage means at the juncture of said arms, the free end of said long arm having a locking member pivotally mounted thereon and the free end of said short arm being connected to said force transmission means, and a support bracket fixed with respect to said linkage means and having a plurality of stop means thereon; and wherein in one of said extreme positions said free end of said long arm is releasably engaged with one of said stop means and another of said stop means is engaged with said linkage means with said bellcrank pivot point, said stop means, and said short arm-to-force transmission means connection each being so located with respect to the other that aerodynamic load forces imposed on said vanes in said one of said extreme positions cannot move said linkage means in the absence of a signal applied to said force transmission means, and wherein in the other of said extreme positions said locking arm is urged into latching engagement with another of said stop means and said linkage means is prevented from returning said vanes to said one of said extreme positions.

References Cited by the Examiner
UNITED STATES PATENTS

| | | | |
|---|---|---|---|
| 1,846,488 | 2/1932 | Jackson | 170—160.38 |
| 2,823,700 | 2/1958 | Christensen | 138—46 |
| 3,007,628 | 11/1961 | Nichols. | |
| 3,007,675 | 11/1961 | Suss. | |

ISADOR WEIL, *Primary Examiner.*

WILLIAM F. O'DEA, *Examiner.*